Sept. 10, 1968 S. TILESI 3,400,453
INJECTION MOLDS FOR MANUFACTURING THERMOPLASTIC LAMP SOCKETS
Filed Sept. 11, 1964 7 Sheets-Sheet 7

United States Patent Office 3,400,453
Patented Sept. 10, 1968

3,400,453
INJECTION MOLDS FOR MANUFACTURING
THERMOPLASTIC LAMP SOCKETS
Silvano Tilesi, Via Palestro 6, Florence, Italy
Filed Sept. 11, 1964, Ser. No. 395,822
Claims priority, application Italy, May 4, 1964,
10,034/64
9 Claims. (Cl. 29—592)

ABSTRACT OF THE DISCLOSURE

An injection mold for the mass production of pea-type lamp sockets having a split cavity into which is positioned a split core carrying knife blades actuated by the swinging movement of the split core to cut completely through a central portion of an insulated wire molded into the lamp socket body and also to strip the insulation away from the adjacent cut ends. Upon the longitudinal removal of the split core from the split body cavity, flat conductors are inserted into sockets which have been cast into the lamp body socket. Such flat conductors engage and are held permanently in electrical contact with the bared copper wires by a forced mechanical fit.

---

The invention relates to apparatus and process for the forming of the so-called bead or pea lamps having very small dimensions and provided with connection base and metal wires forming the lamp supply contacts. More specifically this invention relates to apparatus and process for manufacture of lamp sockets of this type which are formed by a block of thermoplastic material in which two covered conductors are embedded; the latter project from the wall of the recess formed by the lamp socket for the lamp end and present a projecting uninsulated portion assuring the contact with metal blade-like elements to allow the positive contact with the wires forming the contact terminals or ends of the lamp internal filament.

According to the invention, there is provided apparatus for manufacturing a lamp socket by injection molding which comprises an injection mold having two portions each having a cavity which align to define a lamp socket body, a first pin means for rotatably mounting the body portions between opened and closed positions, a central core having two portions each having an external surface which align to define a preselected cavity which opens to one end of the lamp socket body for receiving a lamp base, a second pin means disposed transversely to the first pin means for rotatably mounting the two core portions between opened and closed positions, means moving the central core portions between opened and closed positions, means placing an insulated wire through the mold cavity and between the core portions, each of the core portions having a central cutting edge which engage when the core portions are closed for cutting both the insulation and the conductor of the insulated wire positioned through the core portions, each of the core portions also having a pair of end cutting edges which when closed are spaced to cut only the insulation of the insulated wire, and means longitudinally moving the core portions in a closed position along the axis of the cavity whereby the portion of the insulated wire in the cavity is centrally cut apart and the two adjacent wire ends have the insulation thereat stripped off.

The invention will be better understood by referring to the accompanying drawings, which illustrate two embodiments of the same invention. In the drawings.

According to what is illustrated in FIGS. 1 to 7, 1 denotes the lamp socket body made of thermo-plastic material, which is provided with a reduced axial extension 1a and axially with a recess to accommodate the base of end or heel T of a lamp L; this lamp is of the so-called bead or pea-type lamp and is provided with a pair of contacts C, each of which is formed by a conductor which is bent back upon base T and along its side walls. The recess 2 is wider than an adjacent cavity 3 which receives base T; betwen the two portions 2, 3 there is provided a suitable step 4. Two longitudinal slots 3a between portions 2, 3 are suited to each accommodate a metal blade-like element 5 which are designed to form a sufficiently extended contact, so that—when introducing the base T of the lamp L into the so made lamp socket—there is a positive contact between the two side conductors C to the heel T with the corresponding blades 5.

The insulated conductors 7 are embedded in the body 1 and said conductors serve for the voltage supply as a consequence of their bare ends 7a projecting into the recess 2, over step 4 and into recess or cavity 3 to form a pair of metal contacts. When the metal blades 5 are introduced—said blades forming the contact ends in the longitudinal slots 3a—the blades contact and hold the conductors 7a into slots 3a, forcing them between the slot 3a and its associated blade 5. The two blades therefore, once inserted in this manner into the slots 3a maintain the firm contact with the associated bared conductors 7, forming the supply terminals of the lamp as above described without any need of establishing a firm metal contact of a mechanical nature between the blades 5 and the associated conductors 7.

In order to form a lamp socket as illustrated in FIGS. 1 to 7, provisions are made for equipment as shown in FIGS. 8 to 13. Such equipment includes two mold portions or hinged die halves 11 which define the cavity of a die when closed, and are hinged by respective pins or pivots 12 flanking a movable camming member 13. Such portion 13 is tubular in the illustrated embodiment and in the interior thereof there is housed a central portion 14 to be axially moved with respect to the member 13. The central 14 carries a transversal pin 15, to which two core portions 16 are linked, such core portions 16 being substantially symmetrical except on the transversal linkage to the pin 15; these core portions 16, when closed, form the core for the cavities 2, 3 as previously defined. These two core portions 16 when closed (particularly see FIG. 12) form a slot 16a capable of housing the insulated conductors 7. Moreover, the core portions 16 form, at the outer ends of the slot 16a, two pairs of knives 16b which are shaped in such a manner as to allow—with the closure of the two core portions 16 one on the other—the slicing off of the insulation 7b of the conductor 7, in such a manner to leave the metal wire 7c bare and which will thus form the aforesaid end portions 7a to establish the desired electrical contact; the lengths 7a of the bare metal wire are located on the interior of the housings or slots 16a. A central pair of knives 16c serves to completely sever the conductor 7, included the metal portion 7c, to divide it into two portions. The members 14 and 13 are subjected to axial mutual movements, in such a manner that the element 13 advancing relative to the element 14 and coacting with the sloping cam profiles of the elements 16, tend to close 16 and clamp them together in a general resilient manner. With the clamping of the two central core portions 16, one against the other, the slicing by the knives 16b of the insulation 7b is effected and by action of the knives 16c the metallic conductor is cut through in the central zone, the two portions of the conductor thus separated being firmly retained by the closure of the elements 16.

In the manufacturing process, a core 18 is movable towards the assembly of the elements 13, 14, 16. The core 18 is provided with a pair of longitudinal casting pins 18a which are designed to define the longitudinal slots 3a in the core 1. The injection (not shown) of the plastic materials can be effected through the element 18.

Figures 1, 2, 3, 4, 5, 6, 7:
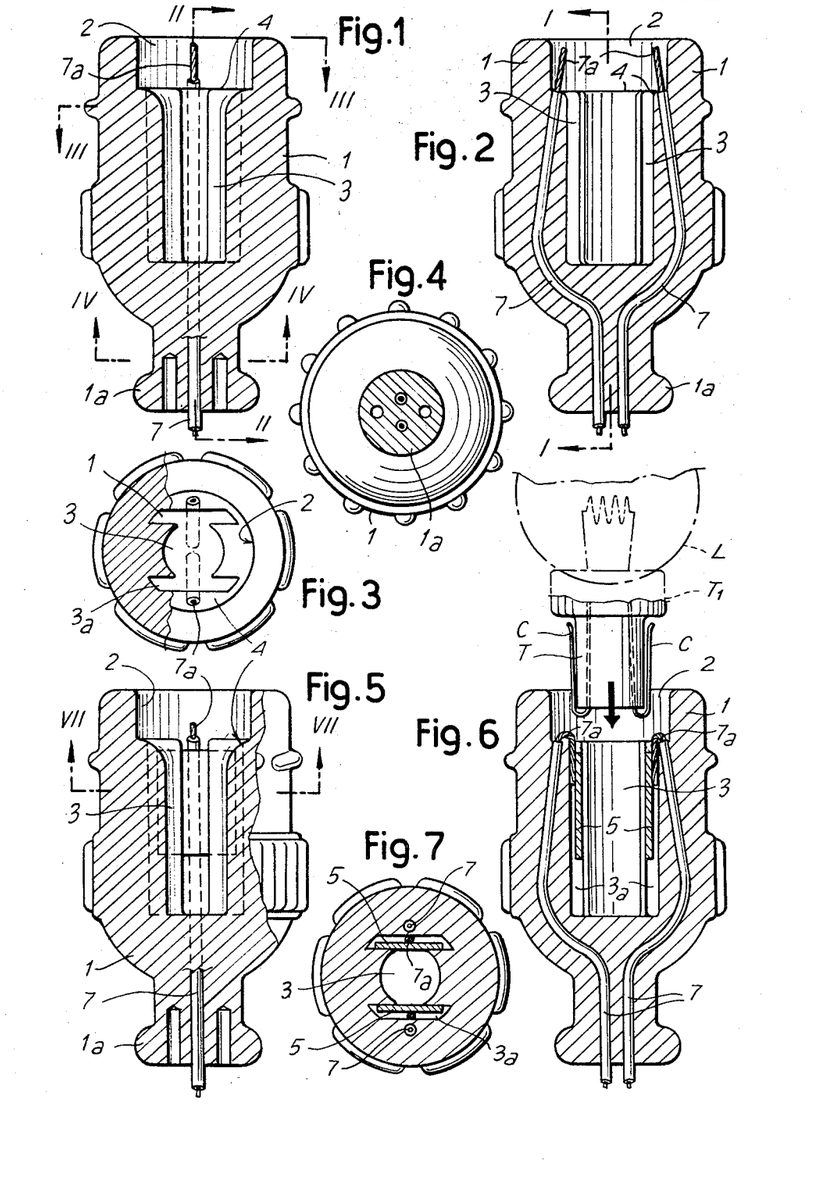
FIG. 1 illustrates a lamp socket in a longitudinal section taken along the line I—I of FIG. 2.
FIG. 2 illustrates a longitudinal section taken along the line II—II of FIG. 1.
FIGS. 3 and 4 illustrate axial views and a partial section taken along the lines III—III and IV—IV of FG. 1.
FIGS. 5, 6 and 7 illustrate the lamp socket completed with the blade-like extended contacts respectively in a section similar to that of FIG. 1, in a section similar to that of FIG. 2 and in a transversal section taken along the line VI—VI of FIG. 5, respectively.
Figure 8:
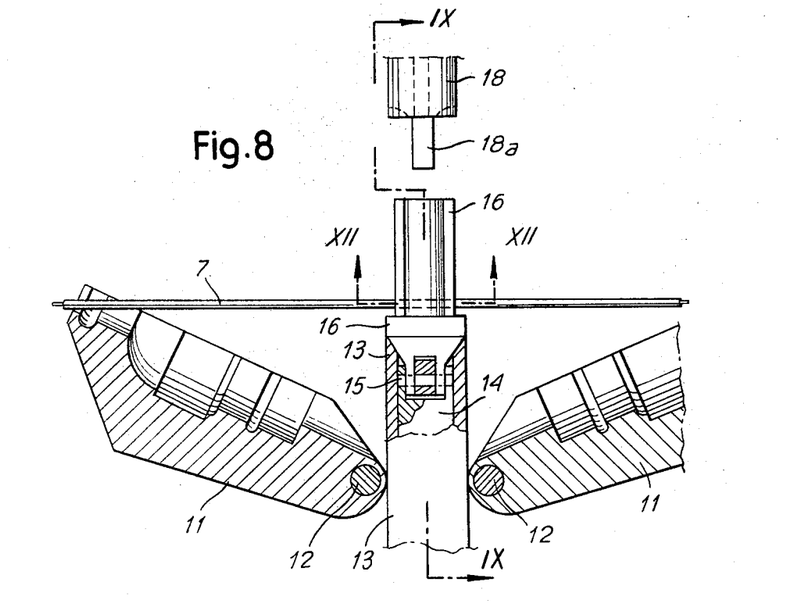
FIG. 8 illustrates a die for the forming of the lamp socket of the previous figures, in the open arrangement.
Figure 9:
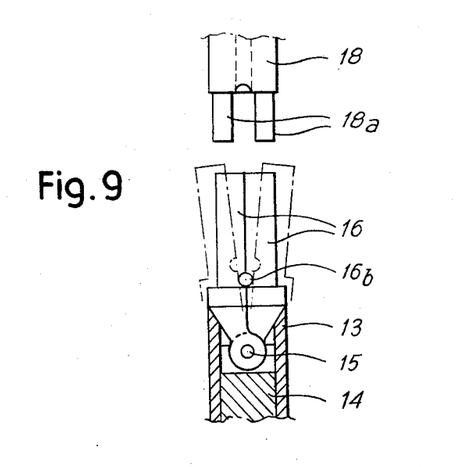
FIG. 9 illustrates a section and a view taken along the line IX—IX of FIG. 8.
Figure 10:
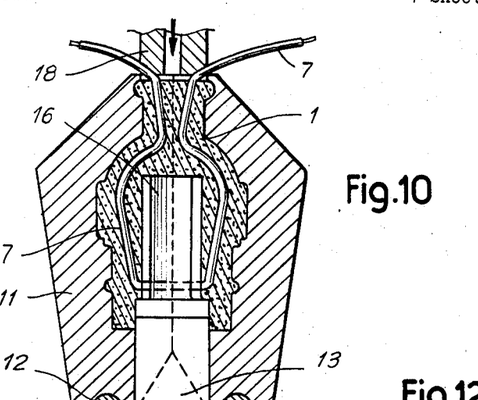
FIG. 10 illustrates the die closed in the injection arrangement.

In the arrangement of the open die, as diagrammatically illustrated in FIG. 8, the two hinged die halves 11, 11 being greatly inclined with respect to the axis of the die, the conductor 7 is located between the two divergent elements 16, as shown in the open position by the dashed line in FIG. 9, and in the recesses 16a and between the knives 16b, 16c. As a first operation, a relative motion between the portions 13, 14, closes elements 16 of the core and in this way effects the slicing of the coating 7b by the knives 16b and the cutting of the conductor into two length by effect of the knives 16c. The two lengths of the conductor are firmly retained by the two closed elements 16 which form the recesses 2, 3 of the lamp socket. In this arrangement, the die halves 11 are closed around the pin means 12. As a second operation, there is provided a movement between the members 13, 14, 16 and the element 18, to complete the die and provide for the injection, as it is shown in FIG. 10. Thus the forming of the body 1 is obtained and said body embeds the conductor 7 in the two sections in which it has been divided by the cutting operation of the knives 16c. In the third stage of the injection, there is a relative motion between the members 13, 14, 16 and the assembly of the die formed by the portions 11 and 18. In this stage, the withdrawal is effected of the end portions 7a of the conductor 7c from closed elements 16 while the portions 7x of the coating 7b' which are internal and contained in the slots 16a, are retained by the closed elements 16. In this way, the separation of the end 7a of the conductor 7 from its own coating is made; the portions 7x of the coating are then expelled from the slots 16a, after the diverging of the elements 16, by effect of a compressed air jet or the like. Then the hinged die halves 11 are opened and the molded piece 1 is kept in the pre-established position by element 18, which with the pins 18a maintains the engagement with the piece 1. In this arrangement (also see FIG. 13), as a fourth stage, by means of a suitable support 21, the pair of blades 5 is inserted into the seats 3a of the housing 3, 2 and said blades are held by the support 21 which is moved with respect to the element 18 in such a manner as to insert the two blades 5, arranged with the desired clearance, in the slots 3a. With this operation, each peeled end 7a of the conductor 7 is folded and the metal contact is made between the conductors 7, 7a and the blades 5, the latter forming the terminals of contact with the bead lamp wires.

Figures 11, 12, 13, 14:
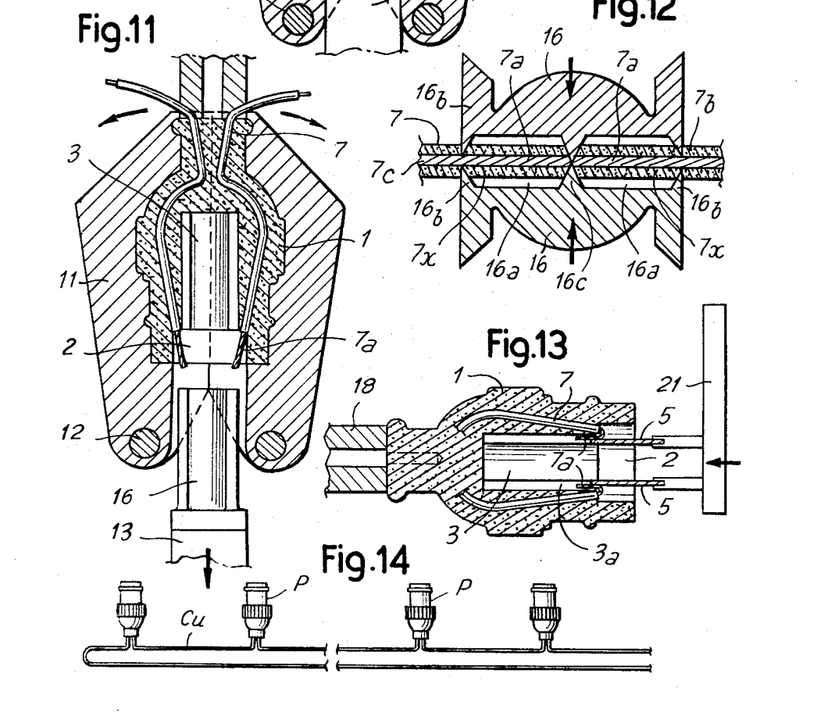
FIG. 11 illustrates one of the initial stages of the die opening.
FIG. 12 illustrates a transversal section taken along the line XII—XII of FIG. 8.
FIG. 13 illustrates the insertion of the blade-like contacts.
FIG. 14 illustrates an assembly of molded lamp sockets on a single continuous conductor.

It is to be noted that the distance between the farthest end of the valves 11 from the linkages 12 can determine the deformation of the cable 7 from the rectilinear arrangement illustrated in FIG. 8 to the arcuate arrangement illustrated in FIGS. 10 and 11. In alternative, a suitable axial movement of the assembly of the members 13, 14, 16 may be contemplated with the valves 11, still restrictedly open.

For a multiple production, provisions are made in an advantageous manner for multiple dies such as those described or having several impressions and there are provided means to locate a conductor in correspondence of each of the dies respectively of each of the impressions of the single die.

In this way it is possible to set up an assembly of lamp sockets as indicated by P in FIG. 14. The lengths of conductor separating the lamp sockets may be appropriately adjusted by effect of the conductor feed control to provide a certain group of equidistant lamp sockets with a longer portion of conductor for the connections.

Figure 15:
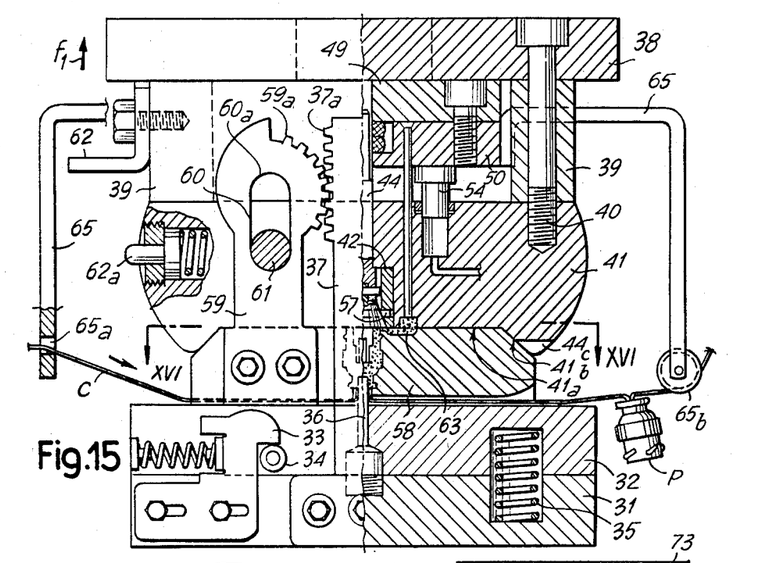
FIG. 15 illustrates a cross-section of a multiple die according to a second embodiment.

According to what is illustrated in FIG. 15 and following ones, 31 indicates a fixed portion of the die, to which an extracting plate 32 is matched and coupled to the portion 31 by a hook 33 sliding and co-operating with a pin 24. The hook 33 retains the portions 31 and 33 from separating against the action of the springs 35 and said hook 33 is promptly controlled by a per se known means and not illustrated. The plate 32 is perforated to accommodate pins 36 which are borne by the portion 31 and which are equivalent to the pins provided in the member 18 of the previous embodiment to form the support of the piece after the opening of the die and before the extraction operated by the motion of the plate 32. Two studs 27 depend from the fixed portion 31 and have racks 37a on the two ends thereof for the hereinafter described purposes.

Figures 17, 18, 19, 20:
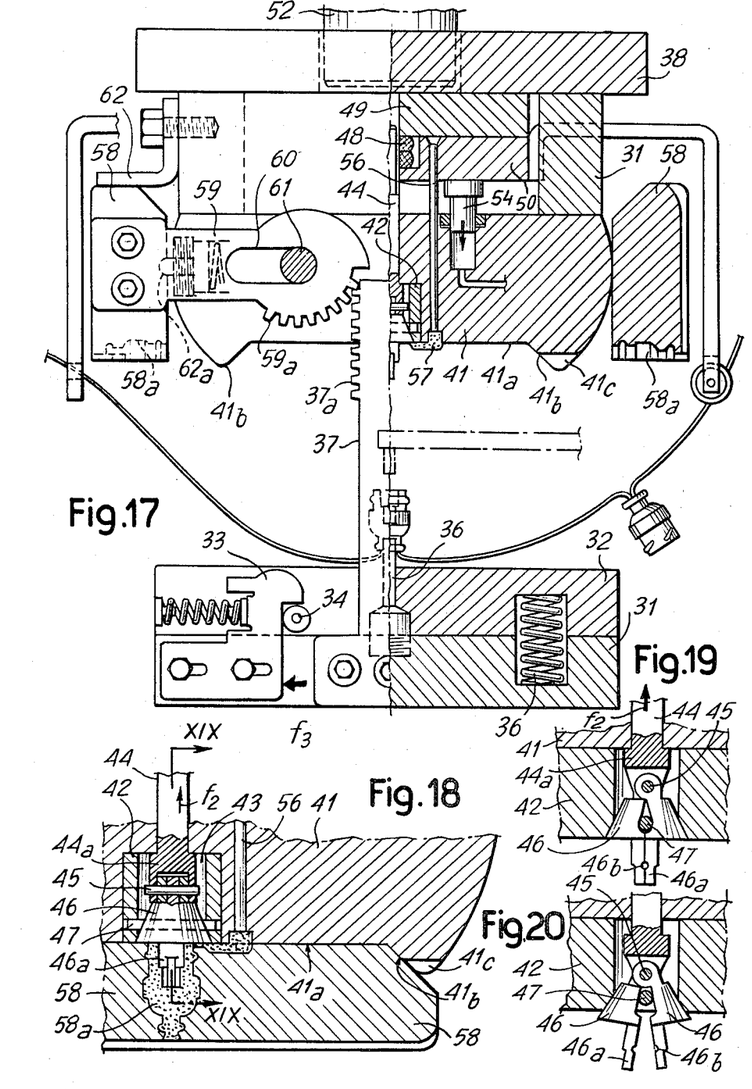
FIG. 17 illustrates the die of FIG. 15 but in the complete open arrangement.
FIG. 18 illustrates an enlarged detail of FIG. 15.
FIG. 19 illustrates a cross section taken along the line XIX—XIX of FIG. 18 with the members forming the internal cavity of a lamp socket in the closed arrangement.
FIG. 20 illustrates the same members of FIG. 19 in the open arrangement to accommodate the conductor.
Figure 22:
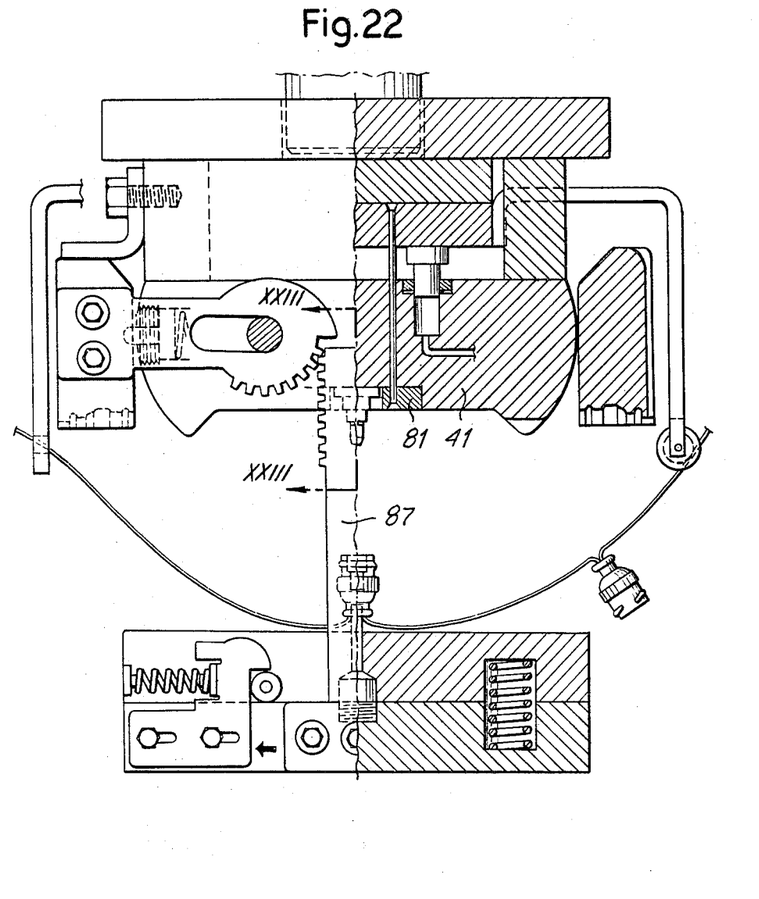
FIG. 22 illustrates an axial section of the open die, corresponding to FIG. 17 of the preceding embodiment, according to a modification with respect to said embodiment.
Figures 23, 24, 26:
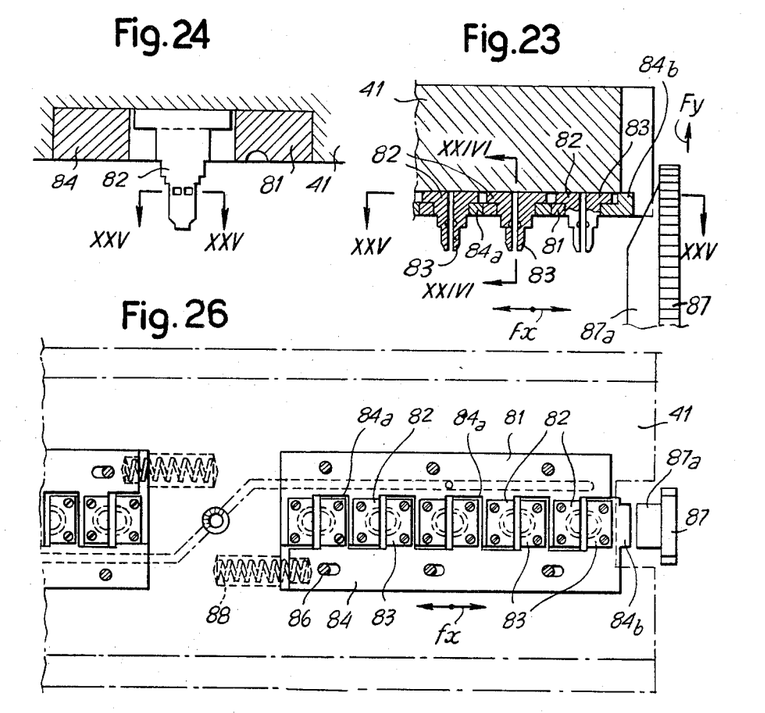
FIG. 23 illustrates a longitudinal section taken along the line XXIII—XXIII of FIG. 22.
FIG. 24 illustrates an enlarged sectional view taken along the line XXIV—XXIV of FIG. 23.
FIG. 26 illustrates a cross sectional view taken along the line XXVI—XXVI of FIG. 23.

Element 38 is the movable portion of the die, by the movement of which (in the direction of the arrow $f_1$ of FIG. 15) it is possible to obtain the opening of the die. A portion 41 of the die, forming a cross-bar and whose front surface is directed towards the plate 32 is shaped with a depression 41a and a centering step 41b, is secured to the plate 38, through spacers 39 and bolts 40, for the hereinafter described purposes. Grooves 41c are also provided in correspondence of each of the impressions for a lamp socket. A central longitudinal seat is formed in the piece 41 for a longitudinally extending block 42 and provided with seats as particularly illustrated in FIGS. 18 to 20, to accommodate the members forming the internal cavity of the lamp sockets and engaging the conductor.

In particular, in correspondence of each of the impressions in the member 42 there is made a seat 43 in which the head 44a of a stem 44, passing through the block 41, slides. Two symmetrical portions 46 are linked by means of a pin 45 to the head 44a and said portions 46 can be diverged as scissors and are capable of being closed in such a manner as to form with the extensions 46a the seat of the corresponding impression in the lamp socket. The members 46 are designed to co-operate with corresponding profiles of the outer edge of the corresponding seat 43 in such a manner that when the stem 44 re-enters into the direction of the arrow $f_2$ of FIGS. 18 and 19, the clamping of the pair of elements 46, 46a is effected to cut the conductors centrally and to remove the insulation from the cut ends in the way and with the criteria indicated for the previous embodiment. In particular, 46b indicates the apertures in the extensions 46a, which correspond to the position of the conductor whose coating is to be severed. In order to allow the diverging of the portions 46, 46a around the hinge 45, and that is to pass from the arrangement of FIG. 19 to the arrangement of FIG. 20—with the movement of the stem 44 in the direction opposite to that of the arrow $F_2$ in FIG. 19—there is provided a pin 47, which is borne by the block 42 and co-operates with the inclined profiles of the two members 46 to determine the diverging or opening thereof. The several stems 44 are anchored by means of the nuts 48 to a pair of plates 49, 50 which are movable in the interspace between the portion 38 and the plate 41. The assembly 49, 50, to which the stems 44 are combined, is capable of being moved with respect to the assembly 38, 39, 41 in a direction from a fixed member 52 (see FIG. 17) which penetrates through a window of the member 38 to act on the assembly 49, 50 in such a direction so as to move the stems 44 in a direction opposite the arrows $f_2$ (with respect to the bilock 41). The reversed movement, that is, the movement of the assembly 49, 50 which corresponds the movement according to the arrow $f_2$ of the stems 44 with respect to the block 41, is operated by hydraulic jack systems 54 (see FIG. 17) which operates between the assembly 49, 50 and the block 41. The expelling stops 56 are also combined into the assembly 49, 50, and said expelling members act in correspondence with channels 57 made in the surface 41a of the block 41 to allow the feed of the several cavities with the injection material; the material being injected in correspondence of at least a central position indicated by 57a in FIG. 16 where the channels 57 are illustratively shown.

In order to form the several cavities, there are provided two symmetrical members 58, which are longitudinally separatable and may be closed together to form the two die halves with the series of impressions or cavities 58a. The two members 58 when closed to the impressions for the lamp sockets, are housed against the surface 41a of the member 41, as they are centered and stabilized in their position by the inclined profiles 41b. Each of the members 58, forming an elongated plate, is provided at the ends, with two arms 59, fixed by appropriate bolts. The two arms 59 form, at the end and on the internal portion, a geared sector 59a capable of co-operating with the corresponding rack 37a of each of the members 37 integral to the fixed portion 31. Each arm 59 moreover is provided with a slot 60, whose end portion 60a— farthest from the corresponding member 58—is substantially concentric to the geared sector 59a. Through each slot 60, there is extended a pin 61 which is integral to the block 41. The arrangement is such whereby, when the arms 59 are moved with respect to the pins 61 to an extent bounded by the end 60a of the slot 60, the assembly of the pairs of arms 59 and associated member 58 borne thereby is capable of rotating around the pin 61 to assume the position illustrated in FIG. 17, from the position illustrated in FIG. 15, when the die is opened. Such position is defined both by stops 62 borne by spacers 39, and by resilient stop pins 62a which are carried by the relative block 41 on the side. One of the members 58 is provided, on the surface corresponding to the surface 41a, and in correspondence of each of the impressions 58a, with a joining recess 63 which is extended between the associated impression or cavity and the zone corresponding to the feed channel 57 of the injection material. Consequently, through the channel 57 and the impression connections 63 the material is fed into the impressions 58a through a zone having a cross-section restricted between the impressions 58a and the same connections 63. The material in such zone may thus be easily separated, or cut off.

The assembly 49, 50 carries, through stirrups 65, two yarn-guides for each impression or cavity, for the conductor C, one of the yarn guides having a hole as indicated by 65a, and the other one having a roller as indicated by 65b. The two yarn-guides 65a, 65b define the span of the conductor C therebetween, corresponding exactly to the apertures 46b of the portions 46a in any arrangement of these portions. Both the portions 46a and the yarn-guides positively joined or connected to the assembly 49, 50.

In the arrangement shown in FIG. 15 that is when the die is closed, the two members 58 form, with their impressions or cavities, the seats for the injection and the injection takes place through, for example, an injection position 57a (see FIG. 16) through the channels 57 and the impressions 63 to the impressions 58. The two die halves of the members 46, 46a are closed in the arrangement of FIG. 19, whereby the portions 46a form the recess in the lamp socket to be injected, while the conductor is engaged by the two portions 46a, as it is cut in the manner already defined for the previous embodiment and for the already defined purposes.

The conductor or wire C is extended between the plate 32 and the surface of the members 58 directed thereto, which members will be provided for said purpose, with appropriate transversal recesses to allow the housing of the conductors C, in correspondence of each of the impressions. The conductors C carry, on the side of the yarn-guide 65b, the lamp sockets P already formed previously and which can be transported by the roller yarn-guides 65b. The extractors 56 are located behind with respect to the block 41, and the valves 46, 46a are clamped one against the other by effect of the thrust obtainable from the hydraulic jacks 54, whereby it is positively possible to obtain the cutting of the conductor and are peeling of the insulated coating, as already previously described. The pins 61 are located on the opposite side of the profile 60a of the associated slots 60. Starting the movement of the member 38 movable according to the arrow $f_1$ of FIG. 15, firstly it is possible to determine the translation of all the members connected to the plate 38 in the direction of the arrow $f_1$, while the members 58 remain in the position assumed because of the impossibility of rotating 59 and the rack 37a being fixed with respect to the motion of the member 38. When the pins 61 reach the portion 60a of the slot 60 owing to the direction of the motion of the assembly 38, 39, 41, the members 58 will be out of the recesses defined by the profiles 41b and thus the subsequent motion will determine the rotation of the geared sectors 59a on the racks 37a and the diverging or opening of the members 58, which will be changed from the arrangement of FIG. 15 into the arrangement of FIG. 17. The lamp sockets obtained by the impressions or cavities 58a will remain borne by the pins 36. It is to be noted that in the first portion of the stroke of the assembly 38, 39, 41, the portions 46a will have extracted the insulated coating from the central length of the conductor engaged thereby, the lamp sockets being retained by the members 58 still closed or coupled. The feeder heads portions formed by the channels 57 in the impressions 63 are entrained by the member 41. At the end of the stroke, the member 52 moves the assembly 49, 50 in such a manner that the extractors 56 expell the thus formed gates or feeder heads, while the stems 44 advancing, are diverged or opened from the arrangement of FIG. 19 to the arrangement of FIG. 20, ready to accommodate again a subsequent span of the conductor C. After having eventually inserted the metal blades into the lamp sockets still supported by the pins 36, any suitable control—acting in the direction of the arrow $f_3$ of FIG. 17—moves the hooks 33 from the pins 34, whereby the springs 36 move the expelling plates 32, which extract the lamp sockets from the pins 36. The conductors may thus be moved along the yarn-guides and a new span of conductor—stretched between the yarn-guides—corresponds to the cutting apertures 46b of the extensions 46a of the members 46. With reversed motions of the assembly 49, 50 with respect to the assembly 38, 31, 41, by effect of the jacks 54, the members 46, 46a are closed again and the conductor is seized again in the correct position; then the several elements of the die are coupled or closed again, and are returned to the arrangement of FIG. 17 from the arrangement of FIG. 15. In particular, the members 58 gather up or collect the length of conductor stretched between the two yarn-guides and engaged centrally by the two portions 46a as they are closed together to determine the deformation of the conductor in such a manner that the conductor is properly embedded in the injected material, in the lamp socket zone, to serially form similar lamp sockets.

Figures 16, 21:
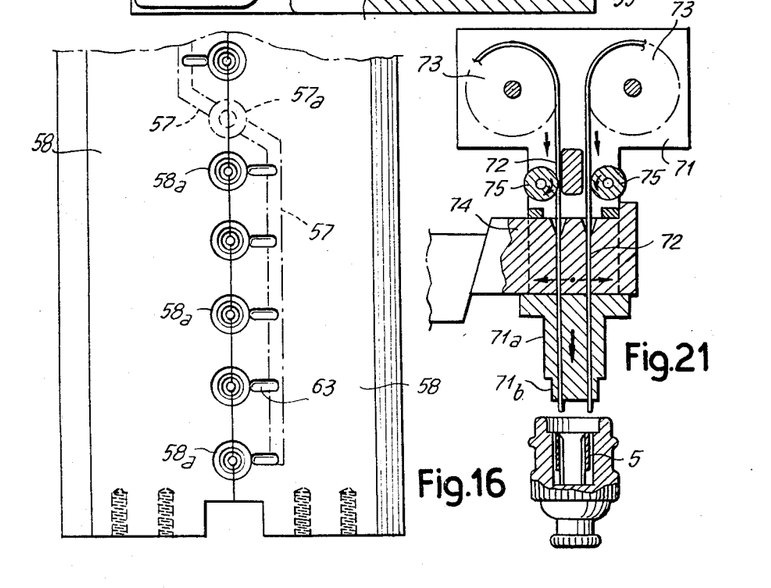
FIG. 16 illustrates a cross sectional view taken along the line XVI—XVI of FIG. 15.
FIG. 21 illustrates a device for the insertion of the contact blades.

According to the scheme of FIG. 21, provisions are made for a device for the insertion of the contact blades (such as those 5 of FIGS. 6 and 7), from a continuous metal strip. According to this scheme, an assembly 71 is provided for and which is movable according to the axis of the impression or impressions of the die, after the manufacturing hereinbefore described. The assembly 71 forms, in the front portion 71a, two parallel and spaced channels like the seats of the blades 5 in the lamp socket. The strips 72, coming from reels or coils 73, mounted on the assembly 71, are fed into said channels. The strips 72 also pass through channels cut in a member 74, which is movable transversally to the extension of the channels; said member 74, in co-operation with the portion 71a, forms a shear for the strips by slight transversal motions of the member 74. The strips are fed, for instance, by operation of the rollers 75, which each time advance the strips according to a length corresponding to the portions 5 to be inserted. With the advance or feed of the strips, the insertion of the portions 5 is determined, said portions 5 being subsequently urged into the channels of the member 71a. The end 71b of said portion 71a is introduced into the lamp socket to assure the centering and the alignment with the seats in the lamp sockets for the blades 5.

According to what is illustrated in FIG. 22 to 26, the members corresponding to those of the equipment illustrated in the previous embodiment, are indicated with the same references thereof. As a variation, in the block 41, there is a seat for a plate 81, which presents a plurality of openings and locks on the block 41 the fixed portions 82 of the several cores; said portions 82 are capable of being coupled with the movable portions 83 of the same cores. Said portions 83 are mounted on the extensions 84a of a slide 84, capable of slight movements in the direction of the double arrow $fx$ of FIGS. 23 and 26, for what is allowed by the slots cut therein and through which the small columns 86 pass. With this arrangement, the movable portions of the core 83 are capable of being separated as shown in the drawing and of being approached to the fixed parts 82 to complete the core. The slide 84 is actuated by an arm 87 which forms the rack corresponding to the rack 37 of the previous case. The arm 87 is provided with a cam profile 87a designed to act on an appropriate extension 84b of the slide 84, in such a manner as to urge the slide in the direction towards left, looking at FIGS. 23 and 26 and against the action of a spring 88, which on the contrary stresses the slide in an opposite direction, that is, in the diverging or opening direction of the two members 82, 83 of the cores. Therefore the closure of the longitudinal core parts 83 and 82 is determined by the advance of the arm 87 in the direction of the arrow $fy$ of FIG. 23 and said closure is determined when the parts of the die are approached to be coupled or closed and to be then arranged for the injection.

Figure 25:
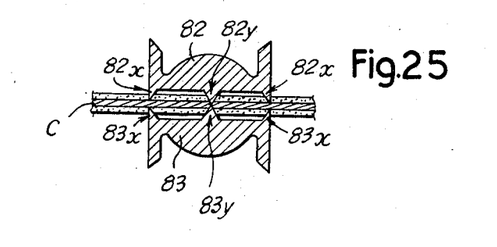
FIG. 25 illustrates an enlarged cross sectional view taken along the line XXV—XXV of FIG. 24.

As in the previous case, there is provided a location of a conductor for the forming of a set of lamp sockets thereon, in correspondence of each of the impressions and thus in correspondence of each of the cores formed by portions 83, 82, the conductor extending orthogonally to the alignment of the several impressions. The longitudinal portions of the cores 82–83 are shaped in the cross-section as shown in FIG. 25 to form externally the profile of the cavity to be formed in the injected lamp socket, while in the matching surface, the two portions 82, 83 present a transversal recess or cavity to receive the conductor C, with two pairs of extensions 82x and 83x corresponding each other to engrave or slice the insulating coating of the conductor at the ends of the core and with a cutting extension 82y–83y respectively, arranged at the centre of the core cross-section, and of the passage for the conductor, in such a manner to also sever the conductor in the central position. The pressure for the cutting and slicing or engraving is determined by the movement of the slide by effect of the cam profile 87a. Through the re-opening of the die, the two longitudinal portions of the core are diverged again for a new operation.

It is intended that the drawing only illustrates some embodiments given only as a practical demonstration of the invention, said invention being in conditions as to be varied in the forms and arrangements without however departing from the scope of the concept which informs said invention.

What I claim is:

1. Process of manufacture of lamp sockets, characterized by the fact that it includes the stages of: locating a coated conductor in the zone of an open die, and between the two diverged portions of a central core; of closing the two central core portions on the conductor to determine two spaced engravings or slicings in the conductor coating and a central complete cutting in an intermediate position between the two engravings and to clamp the conductor in the two lengths in which it is divided; of closing the die with a deformation of the conductor in such a manner as to bring it from an extension transversal to the core to locate two lengths substantially longitudinal with respect to the closed die and middlely flanking the core; of injecting material into the die for forming of a lamp socket embedding the two portions of coated conductor in which the single conductor has been divided; of moving axially the core to determine the extraction of the portions previously engaged in the conductor with a stopping of the associated coating and so as to peel said conductor portions; of opening the die to pick up the finished piece; and of moving the finished piece to entrain a length of conductor into position again for the seizing in the open die zone.

2. Apparatus for manufacturing a lamp socket by injection molding which comprises an injection mold having two portions each having a cavity which align to define a lamp socket body, a first pin means for rotatably mounting said body portions between opened and closed positions, a central core having two portions each having an external surface which align to define a preselected cavity which opens to one end of said lamp socket body for receiving a lamp base, a second pin means disposed transversely to said first pin means for rotatably mounting said two core portions between opened and closed positions, means moving said central core portions between opened and closed positions, means placing an insulated wire through said mold cavity and between said core portions, each of said core portions having a central cutting edge which engage when said core portions are closed for cutting both the insulation and the conductor of said insulated wire positioned through said core portions, each of said core portions also having a pair of end cutting edges which when closed are spaced to cut only the insulation on said insulated wire, and means longitudinally moving said core portions in a closed position along the axis of said cavity whereby the portion of said insulated wire in said cavity is centrally cut apart and the two adjacent wire ends have the insulation thereat stripped off.

3. Apparatus according to claim 2 wherein said core portions are moved between opened and closed positions by a camming action between a sloping surface on each core portion and a sloping surface on a coacting member.

4. Apparatus according to claim 2 wherein the external surface of said core portions when closed also define two longitudinal slots and wherein there is provided means for providing a pair of flat conductors and means for moving into a forced fit one flat conductor and one of said uninsulated cut wire ends into each of said slots.

5. Apparatus according to claim 4 including a core having a pair of casting pins which protrude into said mold cavity for removably casting thereof into said socket body so as to mechanically support the cast socket body by said casting pins during the insertion of said flat conductors into said slots after said mold portions are opened.

6. Apparatus according to claim 2 to form a plurality of lamp sockets upon a single insulated wire including means for moving a continuous supply of said insulated wire to a location in the zone of said mold portions and means to move a portion of the insulated wire after the forming of a lamp socket for a preselected length before the casting of an additional lamp socket.

7. Apparatus according to claim 6 including two guides flanking said mold portions and means moving said guides in snychronism with the movement of said core portions in such a manner that the insulated wire is located in a correct position with respect to said core portions.

8. Equipment for mass production of molded lamp sockets including a plurality of apparatus each according to claim 2 and all mounted in a single die to cast several lamp sockets simultaneously.

9. Equipment according to claim 8 wherein all the mold portions move simultaneously and all the core portions move simultaneously and in synchronism with the movement of the mold portions.

References Cited

UNITED STATES PATENTS

| | | | |
|---|---|---|---|
| 954,368 | 4/1910 | Allison | 249—170 X |
| 1,831,144 | 10/1931 | Shearer | 18—5 |
| 2,132,369 | 10/1938 | Geiger et al. | 176—3 |
| 2,665,894 | 1/1954 | Baker et al. | 263—8 |
| 3,188,688 | 6/1965 | Rieth | 18—5 |
| 3,284,853 | 5/1966 | Moneymaker et al. | 18—20 |
| 2,040,235 | 5/1936 | Bateholts | 29—592 |
| 2,158,044 | 5/1939 | Haller | 29—592 |
| 2,855,630 | 10/1958 | Veley | 29—592 |

WILLIAM J. STEPHENSON, *Primary Examiner.*